United States Patent
Beilloin

(10) Patent No.: US 8,019,151 B2
(45) Date of Patent: Sep. 13, 2011

(54) METHODS AND APPARATUS FOR IMAGE COMPRESSION AND DECOMPRESSION USING GRAPHICS PROCESSING UNIT (GPU)

(75) Inventor: David Beilloin, Pessac (FR)

(73) Assignee: Visualization Sciences Group, Inc., Burlington, MA (US)

( * ) Notice: Subject to any disclaimer, the term of this patent is extended or adjusted under 35 U.S.C. 154(b) by 910 days.

(21) Appl. No.: 12/016,033

(22) Filed: Jan. 17, 2008

(65) Prior Publication Data
US 2008/0304738 A1    Dec. 11, 2008

Related U.S. Application Data

(60) Provisional application No. 60/943,106, filed on Jun. 11, 2007.

(51) Int. Cl.
*G06K 9/36* (2006.01)
(52) U.S. Cl. .................... 382/166; 382/232; 382/162
(58) Field of Classification Search .................. 382/162, 382/166, 232, 233, 238, 239, 128, 276, 209; 455/450, 556.1; 714/758, 776; 375/E7.09, 375/E7.153
See application file for complete search history.

(56) References Cited

U.S. PATENT DOCUMENTS

| | | |
|---|---|---|
| 4,746,795 A | 5/1988 | Stewart et al. |
| 4,984,160 A | 1/1991 | Saint Felix et al. |
| 5,128,864 A | 7/1992 | Waggener et al. |
| 5,218,534 A | 6/1993 | Trousset et al. |
| 5,241,471 A | 8/1993 | Trousset et al. |

(Continued)

FOREIGN PATENT DOCUMENTS

DE    10317384 A1    2/2004

(Continued)

OTHER PUBLICATIONS

"Technical Brief: NVIDIA GeForce 8800 GPU Architecture Overview: Worlds First Unified DirectX 10 GPU Delivering Unparalleled Performance and Image Quality" NVIDIA Corporation, Nov. 2006, 54 pages.

(Continued)

*Primary Examiner* — Anh Hong Do
(74) *Attorney, Agent, or Firm* — Nutter McClennen & Fish LLP; David J. Powsner

(57) ABSTRACT

The invention provides, in some aspects, methods for image compression that utilize the central processing unit (CPU) of a digital data processor and its associated graphics processing unit (GPU), together, in order to compress an image. In related aspects of the invention, the GPU is adapted to render at least a portion of an image to an associated texture buffer (i.e., a texture buffer of the GPU) and to transform the resulting image values in that texture buffer to a frequency-based representation. The GPU can, further, order coefficients comprising that frequency-based representation and transfer at least a portion of those coefficients to the associated CPU. That CPU can, in turn, effect transfer of the downloaded coefficients to another digital data processor (or image processing apparatus). Still other aspects of the invention provide methods of image decompression that utilize the central processing unit (CPU) of a digital data processor and its associated graphics processing unit (GPU), together, in order to decompress an image. These methods parallel the compression methods discussed above, albeit in substantially reversed order. Other aspects of the invention provide digital data processing apparatus for image compression, decompression and/or remote image display operating in accord with the methods described above.

42 Claims, 4 Drawing Sheets

U.S. PATENT DOCUMENTS

| | | | |
|---|---|---|---|
| 5,253,171 | A | 10/1993 | Hsiao et al. |
| 5,287,274 | A | 2/1994 | Saint Felix et al. |
| 5,307,264 | A | 4/1994 | Waggener et al. |
| 5,375,156 | A | 12/1994 | Kuo-Petravic et al. |
| 5,412,703 | A | 5/1995 | Goodenough et al. |
| 5,442,672 | A | 8/1995 | Bjorkholm et al. |
| 5,602,892 | A | 2/1997 | Llacer |
| 5,633,951 | A | 5/1997 | Moshfeghi |
| 5,671,265 | A | 9/1997 | Andress |
| 5,813,988 | A | 9/1998 | Alfano et al. |
| 5,821,541 | A | 10/1998 | Tumer |
| 5,825,842 | A | 10/1998 | Taguchi |
| 5,909,476 | A | 6/1999 | Cheng et al. |
| 5,930,384 | A | 7/1999 | Guillemaud et al. |
| 5,931,789 | A | 8/1999 | Alfano et al. |
| 5,960,056 | A | 9/1999 | Lai |
| 5,963,612 | A | 10/1999 | Navab |
| 5,963,613 | A | 10/1999 | Navab |
| 5,963,658 | A | 10/1999 | Klibanov et al. |
| 6,002,739 | A | 12/1999 | Heumann |
| 6,018,562 | A | 1/2000 | Willson |
| 6,044,132 | A | 3/2000 | Navab |
| 6,049,582 | A | 4/2000 | Navab |
| 6,088,423 | A | 7/2000 | Krug et al. |
| 6,108,007 | A | 8/2000 | Shochet |
| 6,108,576 | A | 8/2000 | Alfano et al. |
| 6,264,610 | B1 | 7/2001 | Zhu |
| 6,268,846 | B1 | 7/2001 | Georgiev |
| 6,282,256 | B1 | 8/2001 | Grass et al. |
| 6,289,235 | B1 | 9/2001 | Webber et al. |
| 6,304,771 | B1 | 10/2001 | Yodh et al. |
| 6,320,928 | B1 | 11/2001 | Vaillant et al. |
| 6,324,241 | B1 | 11/2001 | Besson |
| 6,377,266 | B1 | 4/2002 | Baldwin |
| 6,404,843 | B1 | 6/2002 | Vaillant |
| 6,415,013 | B1 | 7/2002 | Hsieh et al. |
| 6,470,067 | B1 | 10/2002 | Harding |
| 6,475,150 | B2 | 11/2002 | Haddad |
| 6,490,607 | B1 | 12/2002 | Oberman |
| 6,507,633 | B1 | 1/2003 | Elbakri et al. |
| 6,510,241 | B1 | 1/2003 | Vaillant et al. |
| 6,519,355 | B2 | 2/2003 | Nelson |
| 6,615,063 | B1 | 9/2003 | Ntziachristos et al. |
| 6,636,623 | B2 | 10/2003 | Nelson et al. |
| 6,697,508 | B2 | 2/2004 | Nelson |
| 6,707,878 | B2 | 3/2004 | Claus et al. |
| 6,718,195 | B2 | 4/2004 | Van Der Mark et al. |
| 6,731,283 | B1 | 5/2004 | Navab |
| 6,741,730 | B2 | 5/2004 | Rahn et al. |
| 6,744,253 | B2 | 6/2004 | Stolarczyk |
| 6,744,845 | B2 | 6/2004 | Harding et al. |
| 6,745,070 | B2 | 6/2004 | Wexler et al. |
| 6,747,654 | B1 | 6/2004 | Laksono et al. |
| 6,754,299 | B2 | 6/2004 | Patch |
| 6,765,981 | B2 | 7/2004 | Heumann |
| 6,768,782 | B1 | 7/2004 | Hsieh et al. |
| 6,770,893 | B2 | 8/2004 | Nelson |
| 6,771,733 | B2 | 8/2004 | Katsevich |
| 6,778,127 | B2 | 8/2004 | Stolarczyk et al. |
| 7,617,436 | B2 * | 11/2009 | Wenger et al. ................. 714/758 |
| 7,751,646 | B2 * | 7/2010 | Inazumi ....................... 382/276 |
| 2001/0026848 | A1 | 10/2001 | Van Der Mark et al. |
| 2002/0099290 | A1 | 7/2002 | Haddad |
| 2002/0123680 | A1 | 9/2002 | Vaillant et al. |
| 2002/0138019 | A1 | 9/2002 | Wexler et al. |
| 2002/0150202 | A1 | 10/2002 | Harding et al. |
| 2002/0150285 | A1 | 10/2002 | Nelson |
| 2003/0031352 | A1 | 2/2003 | Nelson et al. |
| 2003/0046689 | A1 | 3/2003 | Gaos |
| 2003/0065268 | A1 | 4/2003 | Chen et al. |
| 2003/0103666 | A1 | 6/2003 | Edic et al. |
| 2003/0123720 | A1 | 7/2003 | Launay et al. |
| 2003/0135742 | A1 | 7/2003 | Evans |
| 2003/0194049 | A1 | 10/2003 | Claus et al. |
| 2003/0200435 | A1 | 10/2003 | England et al. |
| 2003/0220569 | A1 | 11/2003 | Dione et al. |
| 2004/0010397 | A1 | 1/2004 | Barbour et al. |
| 2004/0015062 | A1 | 1/2004 | Ntziachristos et al. |
| 2004/0022348 | A1 | 2/2004 | Heumann |
| 2004/0066891 | A1 | 4/2004 | Freytag et al. |
| 2004/0102688 | A1 | 5/2004 | Walker et al. |
| 2004/0125103 | A1 | 7/2004 | Kaufman et al. |
| 2004/0147039 | A1 | 7/2004 | Van Der Mark et al. |
| 2004/0162677 | A1 | 8/2004 | Bednar et al. |
| 2005/0152590 | A1 | 7/2005 | Thieret et al. |
| 2005/0270298 | A1 | 12/2005 | Thieret |

FOREIGN PATENT DOCUMENTS

| | | | |
|---|---|---|---|
| EP | 0476070 | A1 | 3/1992 |
| EP | 0492897 | A2 | 7/1992 |
| EP | 0502187 | A1 | 9/1992 |
| EP | 0611181 | A1 | 8/1994 |
| EP | 0925556 | A2 | 6/1999 |
| EP | 00953943 | A2 | 11/1999 |
| EP | 0953943 | A2 | 11/1999 |
| EP | 0964366 | A1 | 12/1999 |
| EP | 1087340 | A1 | 3/2001 |
| WO | WO-9016072 | A1 | 12/1990 |
| WO | WO-9102320 | A1 | 2/1991 |
| WO | WO-9205507 | A1 | 4/1992 |
| WO | WO-9642022 | A1 | 12/1996 |
| WO | WO-9810378 | A2 | 3/1998 |
| WO | WO-9812667 | A2 | 3/1998 |
| WO | WO-9833057 | A1 | 7/1998 |
| WO | WO-0120546 | A2 | 3/2001 |
| WO | WO-0134027 | A1 | 5/2001 |
| WO | WO-0163561 | A1 | 8/2001 |
| WO | WO-0174238 | A1 | 10/2001 |
| WO | WO-0185022 | A2 | 11/2001 |
| WO | WO-0241760 | A2 | 5/2002 |
| WO | WO-02067201 | A1 | 8/2002 |
| WO | WO-02082065 | A2 | 10/2002 |
| WO | WO-03061454 | A2 | 7/2003 |
| WO | WO-03088133 | A1 | 10/2003 |
| WO | WO-03090171 | A2 | 10/2003 |
| WO | WO-03098539 | A1 | 11/2003 |
| WO | WO-2004019782 | A1 | 3/2004 |
| WO | WO-2004020996 | A1 | 3/2004 |
| WO | WO-2004020997 | A1 | 3/2004 |
| WO | WO-2004034087 | A2 | 4/2004 |
| WO | WO-2004044848 | A1 | 5/2004 |
| WO | WO-2004066215 | A1 | 8/2004 |
| WO | WO-2004072906 | A1 | 8/2004 |

OTHER PUBLICATIONS

Hakan Selldin, "Design and Implementation of an Application Programming Interface for Volume Rendering," *Linkopings Universitet*.
Seland, John S. "Programmable Graphics Hardware," Center of Mathematics for Applications, Universit of Oslo, SINTEF-CMA GPU Course, Dec. 12, 2006, 40 pages.
Viola, "Alignment by Maximization of Mutual Information," PhD Thesis MIT (Also Refered to As—"AI Technical report No. 1548"), MIT Artificial Intelligence Lab, Jun. 1, 1995, pp. 1-29.
Weiskopf, Daniel "Basics of GPU-Based Programming," Institute of Visualization and Interactive Systems, University of Stuttgart, IEEE Visualization 2004 Tutorial: Interactive Texture-Based Flow Visualization, 22 pages.
"ATI Website Index," http://www.ati.com/developer/index.html, Dec. 20, 2002, 2 pages.
"Filtered Backprojection Reconstruction", http://www.physics.ubd.ca/~mirg/home/tutorial/fbp_recon.htm, Feb. 6, 2003, 5 pages.
"Image Registration Slideshow", 105 pages.
"Overview of X-Ray Computed Tomography," http://www.howstuffworks.com/framed.htm?parent=c . . . tm&url=http://www.ctlab.geo.utexas.edu/overview/, Dec. 26, 2002, 5 pages.
"Rib Cage Projection," downloaded from http://www.colorado.edu/physics/2000/tomography/final_rib_cage.html on Dec. 26, 2002, 3 pages.
"Technical Brief: NVIDIA nfiniteFX Enniatene: Programmable Pixel Shaders," NVIDIA Corporation, 5 pages.
"Technical Brief: NVIDIA nfiniteFX Engine; Programmable Vertex Shaders," NVIDIA Corporation, 12 pages.
Anuj Jain, "A Programmable Graphics Chip," pcquestcom, Jun. 18, 2001.

B. T. Phong, "Illumination for Computer Generated Pictures," Communications of the ACM, 18(6), Jun. 1975, pp. 311-317.

Cabral et al., "Accelerated Volume Rendering and Tomographic Reconstruction Using Texture Mapping Hardware", Silicon Graphics Computer Systems, 1995 IEEE, pp. 91-97.

Chidlow, et al, "Rapid Emission Tomography Reconstruction," Proceedings of the 2003 Eurographics/IEEE TVCG Workshop on Volume Graphics, Tokyo, Japan, Jul. 7-8, 2003, 13 pages.

Cohen, Michael, et al., "A Progressive Refinement Approach to Fast Radiosity Image Generation," Computer Graphics, vol. 22, No. 4, Aug. 1988, pp. 75-84.

Corner, B., University of Nebraska-Linolcn, MatLab.txt, 2003, 1 page.

Dachille, et al. "High-Quality Volume Rendering Using Texture Mapping Hardware," Siggraph/Eurographics Hardware Workshop, 1998 (8 pages).

Dempster et al., "Maximum Likelihood From Incomplete Data Via the EM Algorithm", Harvard University and Educational Testing Service, Dec. 8, 1976, pp. 1-38.

Dobbins et al., "Digital X-Ray Tomosynthesis: Current State of the Art and Clinical Potential," Physics in Medicine and Biology, vol. 48, pp. R65-R106. (2003).

Doggett, Michael, ATI, Programmability Features of Graphics Hardware, (paper) Apr. 23, 2002, pp. C1-C22.

Doggett, Michael, ATI, Programmability Features of Graphics Hardware, (slideshow) slides 162, 31 pages.

H. Pfister, et. al., "The VolumePro real-time ray-casting System," Computer Graphics (Proceedings of SIGGRAPH), Aug. 1999, pp. 251-260.

Hadwiger, Markus, et al., "Hardware-Accelerated High-Quality Reconstruction of Volumetric Data on PC Graphics Hardware," VRVis Research Center, Vienna, Austria, and Institute of Computer Graphics and Algorithms, Vienna University of Technology, Austria, 9 pages.

Hopf, M., Ertl, T., "Accelerating 3D Convolution using Graphics Hardware," Proc. IEEE Visualization, 1999, 5 pages.

Hudson et al., "Accelerated Image Reconstruction Using Ordered Subsets of Projection Data", IEEE Transactions on Medical Imaging, vol. 13, No. 4, Dec. 1994, pp. 601-609.

Viola, et al., "Hardware Based Nonlinear Filtering and Segmentation Using High Level Shading Languages," Technical Report TR-186-2-03-07, May 2003, 8 pages.

Kruger, and R. Westermann, "Acceleration Techniques for GPU-based Volume Rendering," Proceedings of IEEE Visualization, 2003, 6 pages.

Jones et al., "Positron Emission Tomographic Images and Expectation Maximization: A VLSI Architecture for Multiple Iterations Per Second", Computer Technology and Imaging, Inc., 1988 IEEE, pp. 620-624.

Mueller, and R. Yagel, "Rapid 3-D Cone Beam Reconstruction with the Simultaneous Algebraic Reconstruction Technique (SART) Using 2-D Texture Mapping Hardware", IEEE Transactions on Medical Imaging, Dec. 2000, 19(12): pp. 1227-1237.

Kajiya, J. T., "Ray Tracing Volume Densities," Proc. SIGGRAPH, Jul. 1984, Computer Graphics, vol. 18, No. 3, pp. 165-174.

Kilgariff, E. & Fernando, R. "The GeForce6 Series GPU Architecture," Chapter 30, Excerpted from GPU Gems 2, Copyright 2005 by NVIDIA Corporation, pp. 29-49.

Lange et al., "EM Reconstruction Algorithms for Emission And Transmission Tomography," J Computer Assisted Tomography 8, pp. 306, et seq. (1984).

Lange et al., "Globally Convergent Algorithms for Maximum a Posteriori Transmission Tomography," IEEE Transactions on Image Processing, vol. 4, No. 10, Oct. 1995, pp. 1430-1438.

Li et al., "Tomographic Optical Breast Imaging Guided by Three-Dimensional Mammography," Applied Optics, Sep. 1, 2003, vol. 42, No. 25, pp. 5181-5190.

Michael J. McCool, "Smash: a Next-Generation API for Programmable Graphics Accelerators," *Technical Report CS-200-14, Computer Graphics Lab Dept. of Computer Science, University of Waterloo*, Aug. 1, 2000.

Mitchell, Jason L., "RadeonTM 9700 Shading," SIGGRAPH 2002—State of the Art in Hardware Shading Course Notes, pp. 3.1-1—3.1-39, 39 pages.

N. Max, "Optical Models for Direct Volume Rendering," IEEE Transactions On Visualization and Computer Graphics, Jun. 1995, I(2): pp. 99-108.

Printouts from Microsoft.com, from "http://msdn.microsoft.com/library/defaultasp?url=library/en-us/dx8_c/directx_cpp/Graphics/ProgrammersGuide/GettingStarted/Architecture," Dec. 20, 2002, 22 pages.

Purcell, T., et. al., "Ray tracings on Programmable Graphics Hardware," Computer Graphics (Proceedings of SIGGRAPH), 1998, pp. 703-712.

Roettger, Stefan, et al., "Smart Hardware-Accelerated Volume Rendering," Joint EUROGRAPHICS—IEEE TCVG Symposium on Visualization, 2003, pp. 231-238, 301.

Sandborg, Michael, "Computed Tomography: Physical principles and biohazards," Department of Radiation Physics, Faculty of Health Sciences, Linkoping University, Sweden, Report 81 ISSN 1102-1799, Sep. 1995 ISRN ULI-RAD-R—81—SE, 18 pages.

Wu et al., "Tomographic Mammography Using A Limited Number of Low-dose Conebeam Projection Images, "Med. Phys., pp. 365-380. (2003).

Wynn, Chris "NVIDIA® OpenGL Render-to-Texture," NVIDIA Corporation.

* cited by examiner

| DC$_a$ | 1$_a$ | 5$_a$ | 6$_a$ | DC$_b$ | 1$_b$ | 5$_b$ | 6$_b$ |
|---|---|---|---|---|---|---|---|
| 2$_a$ | 4$_a$ | 7$_a$ | 12$_a$ | 2$_b$ | 4$_b$ | 7$_b$ | 12$_b$ |
| 3$_a$ | 8$_a$ | 11$_a$ | 13$_a$ | 3$_b$ | 8$_b$ | 11$_b$ | 13$_b$ |
| 9$_a$ | 10$_a$ | 14$_a$ | 15$_a$ | 9$_b$ | 10$_b$ | 14$_b$ | 15$_b$ |
| DC$_c$ | 1$_c$ | 5$_c$ | 6$_c$ | DC$_d$ | 1$_d$ | 5$_d$ | 6$_d$ |
| 2$_c$ | 4$_c$ | 7$_c$ | 12$_c$ | 2$_d$ | 4$_d$ | 7 | 12 |
| 3$_c$ | 8$_c$ | 11$_c$ | 13$_c$ | 3$_d$ | 8$_d$ | 11$_d$ | 13$_d$ |
| 9$_c$ | 10$_c$ | 14$_c$ | 15$_c$ | 9$_d$ | 10$_d$ | 14 | 15$_d$ |

Figure 4A

Offset

| 0x0 | DC$_a$ | 1$_a$ | 5$_a$ | 6$_a$ | DC$_b$ | 1$_b$ | 5$_b$ | 6$_b$ | 2$_a$ | 4$_a$ | 7$_a$ | 12$_a$ | 2$_b$ | 4$_b$ | 7$_b$ | 12$_b$ | 3$_a$ | 8$_a$ | 11$_a$ | 13$_a$ | 3$_b$ | 8$_b$ | 11$_b$ | 13$_b$ |
|---|---|---|---|---|---|---|---|---|---|---|---|---|---|---|---|---|---|---|---|---|---|---|---|---|
| 0x18 | 9$_a$ | 10$_a$ | 14$_a$ | 15$_a$ | 9$_b$ | 10$_b$ | 14$_b$ | 15$_b$ | DC$_c$ | 1$_c$ | 5$_c$ | 6$_c$ | DC$_d$ | 1$_d$ | 5$_d$ | 6$_d$ | 2$_c$ | 4$_c$ | 7$_c$ | 12$_c$ | 2$_d$ | 4$_d$ | 7$_d$ | 12$_d$ |
| 0x30 | 3$_c$ | 8$_c$ | 11$_c$ | 13$_c$ | 3$_d$ | 8$_d$ | 11$_d$ | 13$_d$ | 9$_c$ | 10$_c$ | 14$_c$ | 15$_c$ | 9$_d$ | 10$_d$ | 14$_d$ | 15$_d$ | | | | | | | | |

Figure 4B

Offset

| 0x0 | DC$_a$ | DC$_b$ | DC$_c$ | DC$_d$ | 1$_a$ | 1$_b$ | 1$_c$ | 1$_d$ | 2$_a$ | 2$_b$ | 2$_c$ | 2$_d$ | 3$_a$ | 3$_b$ | 3$_c$ | 3$_d$ | 4$_a$ | 4$_b$ | 4$_c$ | 4$_d$ | 5$_a$ | 5$_b$ | 5$_c$ | 5$_d$ |
|---|---|---|---|---|---|---|---|---|---|---|---|---|---|---|---|---|---|---|---|---|---|---|---|---|
| 0x18 | 6$_a$ | 6$_b$ | 6$_c$ | 6$_d$ | 7$_a$ | 7$_b$ | 7$_c$ | 7$_d$ | 8$_a$ | 8$_b$ | 8$_c$ | 8$_d$ | 9$_a$ | 9$_b$ | 9$_c$ | 9$_d$ | 10$_a$ | 10$_b$ | 10$_c$ | 10$_d$ | 11$_a$ | 11$_b$ | 11$_c$ | 11$_d$ |
| 0x30 | 12$_a$ | 12$_b$ | 12$_c$ | 12$_d$ | 13$_a$ | 13$_b$ | 13$_c$ | 13$_d$ | 14$_a$ | 14$_b$ | 14$_c$ | 14$_d$ | 15$_a$ | 15$_b$ | 15$_c$ | 15$_d$ | | | | | | | | |

Figure 4C

METHODS AND APPARATUS FOR IMAGE COMPRESSION AND DECOMPRESSION USING GRAPHICS PROCESSING UNIT (GPU)

This application claims the benefit of U.S. Provisional Patent Application Ser. No. 60/943,106, filed Jun. 11, 2007, entitled "Methods and Apparatus for Image Compression and Decompression Using Graphics Processing Unit (GPU)," the teachings of which are incorporated herein by reference.

BACKGROUND OF THE INVENTION

The invention relates to digital data processing and, more particularly, to image compression and decompression. It has application, by way of non-limiting example, in the compression of two- and three-dimensional images for storage and/or remote visualization.

Digital data processors are increasingly used for the acquisition, transfer, storage, analysis and display of images. In many industries, their use is the norm, having long ago supplanted competing technologies, such as photochemical media (e.g., recording films) for storage and telefax machines for transmission. This is the natural outgrowth of increases in storage capacity and processing power of today's digital data processors, as well as of ubiquitous high-speed digital networks supporting communications among those devices.

Notwithstanding these advances, storage and transmission of digital images remain the bane of image processing system designers and users alike. Whereas faster backplanes and increased use of image co-processors (such as graphics processing units, or "GPUs") have brought image processing and display speeds to acceptable levels—even on desktop and laptop computers—image data is often too large for storage, in quantity, on typical disk drives (or other storage devices) or for rapid transmission over local area networks, wide area networks, and "internets," by way of example.

As a consequence, image compression—i.e., the systematic reduction of the number of "bits" (or other information-bearing units) representing an image—is typically used to reduce image sizes for both storage and transmission. The converse, image decompression, is used to reconstitute an image for processing or display. Common compression techniques exploit bit patterns within the original image (such as in run-length encoding) and/or mathematical transformations of image regions (such as in JPEG encoding).

Regardless of the technique used, image compression and decompression are computationally intensive. In most digital data processor implementations, these tasks are handled on the central processing unit, or "CPU." While this affords the flexibility that is often demanded by compression algorithms, it can have the effect of bringing down overall digital data processor performance.

Accordingly, an object of this invention is to provide improved methods and apparatus for digital data processing. A more particular object is to provide such methods and apparatus for image compression and/or decompression.

Related objects of the invention are to provide such methods and apparatus as facilitate data storage and/or transmission. Still further related objects are to provide such methods and apparatus as facilitate remote image viewing.

Further objects of the invention are to provide such methods and apparatus as more fully utilize the processing resources found in typical digital data processors.

Still further objects of the invention are to provide such methods and apparatus as can be implemented at reasonable cost on legacy, current, and future digital data processing systems.

SUMMARY OF THE INVENTION

The foregoing are among the objects attained by the invention which provides, in some aspects, methods for image compression that utilize the central processing unit (CPU) of a digital data processor and its associated graphics processing unit (GPU), together, in order to compress an image, e.g., for transmission and viewing by a remote digital data processor.

In related aspects of the invention, the GPU is adapted to render at least a portion of an image to an associated texture buffer (i.e., a texture buffer of the GPU) and to transform the resulting image values (e.g., voxels) in that texture buffer to a frequency-based representation. The GPU can, further, order coefficients comprising that frequency-based representation and transfer (or "readback") at least a portion of those coefficients to the associated CPU. That CPU can, in turn, effect transfer of the readback coefficients to another digital data processor (or image processing apparatus).

In other aspects of the invention, the CPU applies compression to the readback coefficients before effecting their transfer to the other digital data processor (or image processing apparatus). This can be, for example, a run length encoding-based compression technique, or otherwise.

Still further aspects of the invention provide methods as described above in which the GPU transforms the image values in the texture buffer from a first color space to a second color space prior to applying the frequency transform. The first color space can be, for example, an RGB color space. The second color space can be, for example, a YCbCr color space.

Yet still further aspects of the invention provide methods as described above in which the frequency transform is a Fourier-related transform. In related aspects of the invention, the frequency transform is a discrete cosine transform (DCT). In further related aspects of the invention, GPU applies the DCT transform in two passes: one, on lines (or "rows") of image values; the other, on columns of image values.

Other aspects of the invention provide methods as described above in which the GPU applies a quantization factor to the coefficients that result from the DCT transform (and that comprise the frequency-based representation). That quantization factor can, for example, reduce information in high-frequency components of the representation (since those are not as readily visible to the human eye) and, likewise, reduce the space required for the frequency-based representation.

Further aspects of the invention provide methods as described above in which the GPU orders coefficients comprising the frequency-based representation so that they will be linearly ordered upon download to the CPU. In related aspects, the ordering places "DC" (or zero-order) coefficients first, followed by lower-frequency "AC" coefficients and, then, higher-frequency "AC" coefficients.

Still further related aspects of the invention provide methods as described above in which the GPU downloads only a portion of the ordered frequency-based coefficients to the CPU.

Still other aspects of the invention provide methods of image decompression that utilize the central processing unit (CPU) of a digital data processor and its associated graphics processing unit (GPU), together, in order to decompress an image. These methods parallel the compression methods discussed above, albeit in substantially reversed order.

Yet still further aspects of the invention provide methods for remote image display in which a first digital data processor uses a compression methodology as described above to compress an image for transfer to a second processor, and in which the second processor utilizes a decompression methodology as described above to decompress that image for display.

Other aspects of the invention provide digital data processing apparatus for image compression, decompression and/or remote image display operating in accord with the methods described above.

Further aspects of the invention are evident in the drawings and the description that follows.

BRIEF DESCRIPTION OF THE DRAWINGS

A more complete understanding of the invention may be attained by reference to the drawings, in which:

FIGS. 4A-4C depict storage of frequency coefficients in a GPU and a CPU in a system according to the invention.

DETAILED DESCRIPTION OF THE ILLUSTRATED EMBODIMENT

Figure 1:
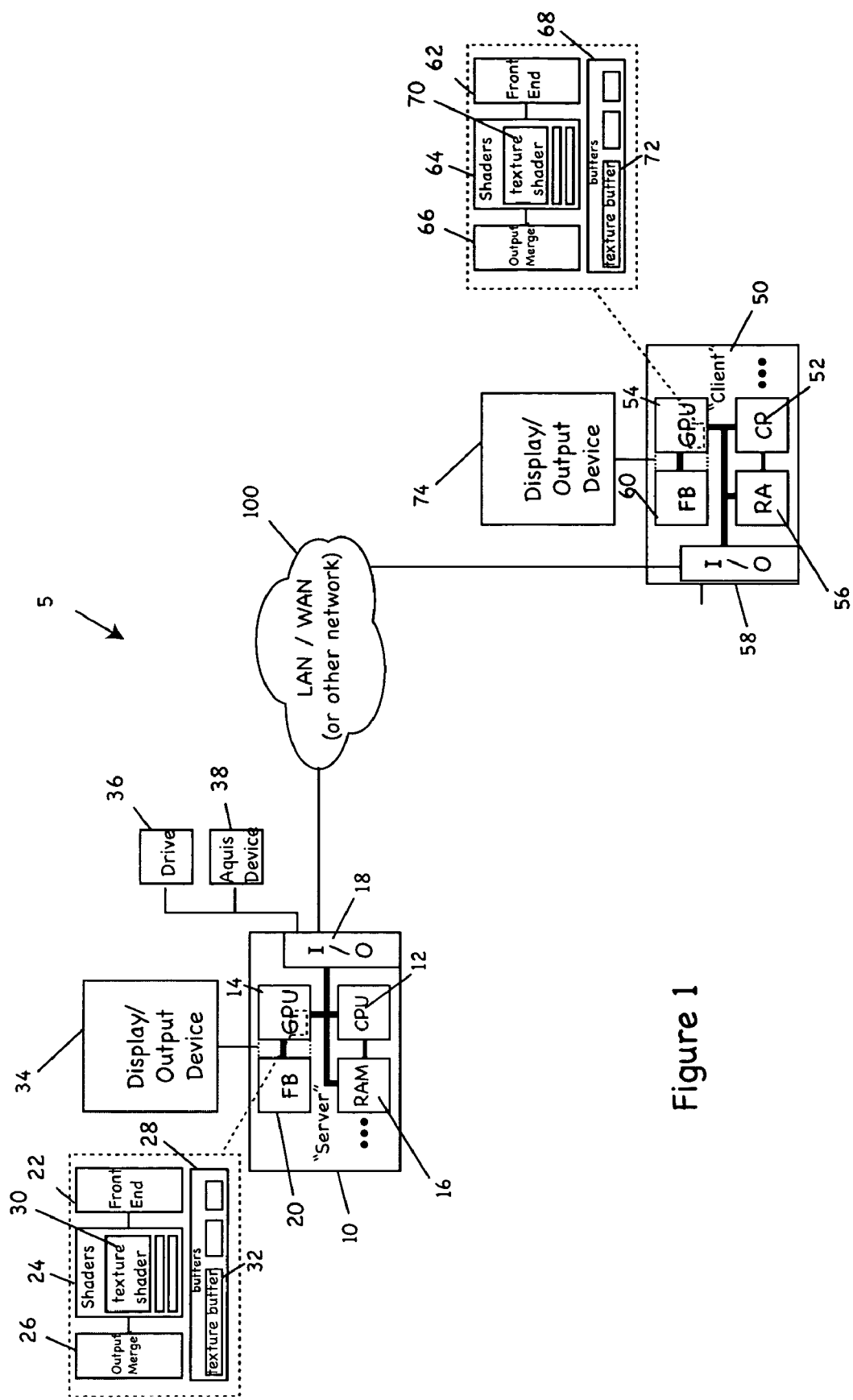
FIG. 1 depicts a system for remote image display equipped for image compression/decompression according to the invention.

FIG. 1 depicts a system 5 and environment for remote image display (a/k/a remote visualization) equipped for image compression/decompression according to one practice of the invention. The illustrated system 5 includes digital data processors 10 and 50 coupled for communication with each other via network 100.

The digital data processor 10 comprises a mainframe, server, workstation, desktop computer, laptop computer, embedded computer, or other computing device of the type generally known in the art, as configured and adapted in accord with the teachings hereof to compress images, e.g., for transmission to digital data processor 50. Thus, illustrated digital data processor 10 includes a central processing unit 12, graphics processing unit (GPU) 14, random access memory 16 and input/output subsystem 18, and frame buffer 20, all of the type conventionally known in the art, as configured and adapted in accord with the teachings hereof. In the discussion that follows, digital data processor 10 is sometimes referred to as a "server" and the operations performed by it are referred to as "server side" operations.

GPU 14 serves as a coprocessor, operating under the control of the CPU 12 to compress images for transfer to digital data processor 50. The GPU may comprise any of many contemporary graphics processing units of the type available in the marketplce (e.g., NVIDA, ATI, and others) having programmable shaders. It includes a front-end 22, shaders 24, output merger section 26, and buffers 28, as shown.

Front-end 22 provides for input assembly and/or other conventional functions, including, by way of non-limiting example canonicalizing vertex data, generating IDs for primitives, vertices, instances, and so forth. Shaders 24 provide for programmable processing of graphics data and include a texture shader 30 of the type conventionally known in the art, as configured and adapted in accord with the teachings hereof, for processing data, e.g., in an associated 2D texture buffer 32. Although shown as part of the GPU 14, it will be appreciated that in other embodiments texture buffer 32 may reside elsewhere. Output merger section 26 provides for color buffer blending and/or other conventional functions, including, by way of example reading, writing and access data in frame buffer 20. It will be appreciated that the GPU architecture shown in FIG. 1 is merely an example and that the GPUs used in other embodiments of the invention may vary.

Although only a single GPU 14 is shown in the drawing, other embodiments of the invention may employ multiple such GPUs. Still other embodiments may incorporate in CPU 12 (or other processing subsystems, e.g., ASICs) the functionality ascribed herein to GPU 14.

Frame buffer 20 comprises a conventional frame buffer of the type known in the art that maintains data representing an image (or images) to be displayed on monitor or other display device 34 (e.g., LCD display, CRT or so forth). The frame buffer, which can be separate from or integral to the GPU 14, operates in accord with the GPU 14 or other subsystems to drive that data to device 34. In some embodiments, frame buffer 20 includes additional storage supporting one or more of the buffers 28 of the GPU.

I/O subsystem 18 operates in the conventional manner, as adapted in accord with the teachings hereof, to exchange data with digital data processor 50 (and other clients) over network 100. The I/O subsystem 18 also supports the input of image data from disk drive(s) or other store(s) 36 and/or image acquisition device(s) 38, e.g., video cameras, still cameras, and other imaging equipment of the type known in the art.

Digital data processor 50 of the illustrated embodiment comprises a mainframe, server, workstation, desktop computer, laptop computer, embedded computer, or other computing device of the type generally known in the art—albeit, as configured and adapted in accord with the teachings hereof to decompress and display images received from digital data processor 10. As above, in the discussion that follows, digital data processor 50 is sometimes referred to as a "client" and the operations performed by it are referred to as "client side" operations.

Illustrated digital data processor 50 includes a central processing unit 52, graphics processing unit (GPU) 54, random access memory 56 and input/output subsystem 58, and frame buffer 60, all of the type conventionally known in the art, as configured and adapted in accord with the teachings hereof.

GPU 54 serves as a coprocessor, operating under the control of the CPU 52 to decompress images transferred from digital data processor 10, as well as to render those images on device 74. As above, the GPU may comprise any of many contemporary graphics processing units having programmable shaders of the type available NVIDA, ATI, and the like, and includes a front-end 22, shaders 24, output merger section 26, and buffers 28, as shown. As above, front-end 62 provides for input assembly and/or other conventional function, including, by way of non-limiting example canonicalizing vertex data, generating IDs for primitives, vertices, instances, and so forth. Shaders 64 provide for programmable processing of graphics data and include texture shader 70 of the type conventionally known in the art, as configured and adapted in accord with the teachings hereof, for processing data, e.g., in texture buffer 72. Although shown as part of the GPU 54, it will be appreciated that in other embodiments texture buffer 72 may reside elsewhere. Output merger section 76 provides for color buffer blending and/or other conventional functions, including, by way of example reading, writing and access data in frame buffer 60. As above, of course, it will be appreciated that the architecture here is merely an example and that the GPUs 54 used in other embodiments of the invention may vary.

Moreover, as above, although only a single GPU 54 is shown in the drawing, other embodiments of the invention may employ multiple such GPUs. Still other embodiments may incorporate in CPU 52 (or other processing subsystems, e.g., ASICs) the functionality ascribed herein to GPU 54.

Frame buffer 60 comprises a conventional frame buffer of the type known in the art that maintains data representing an image (or images) to be displayed on monitor or other display device 74 (e.g., LCD display, CRT or so forth). The frame buffer, which can be separate from or integral to the GPU 54, operates in accord with the GPU 54 or other subsystems to drive that data to device 74. In some embodiments, frame buffer 60 includes additional storage supporting one or more of the buffers 68.

I/O subsystem 58 operates in the conventional manner, as adapted in accord with the teachings hereof, to exchange data with digital data processor 10 (and other serves) over network 100.

Although digital data processor 50 is configured in a similar manner as digital data processor 10, in other embodiments, these devices may vary more widely.

Moreover, although only two digital data processors 10, 50 are shown in the drawing, it will be appreciated that other embodiments of the invention may include a greater or lesser number of digital data processors. Thus, for example, server digital data processor 10 may compress images for transmission to (and decompression/display by) multiple client digital data processors (e.g., including digital data processor 50). Conversely, client digital data processor 50 may be coupled to multiple server digital data processors (including digital data processor 10) for decompression and display of compressed images received from them. It will be further appreciated that, in some embodiments, a single digital data processor is both server and client, e.g., as where a digital data processor compresses image data for storage and later decompression and display via that same device.

Illustrated network 100 comprises LAN, WAN, Internet, or other communications medium (or combination of media) of the type known in the art suitable for transfer of digital data between computing devices. Although such transfer may be accomplished electronically (e.g., via wired, wireless and/or satellite networks—or a combination thereof) in the illustrated embodiment, in other embodiments the transfer may comprise the "physical" transfer of data via CD-ROM, DVD, magnetic tape or other media, instead of or in addition to electronic transfer.

Operation

Figure 2:
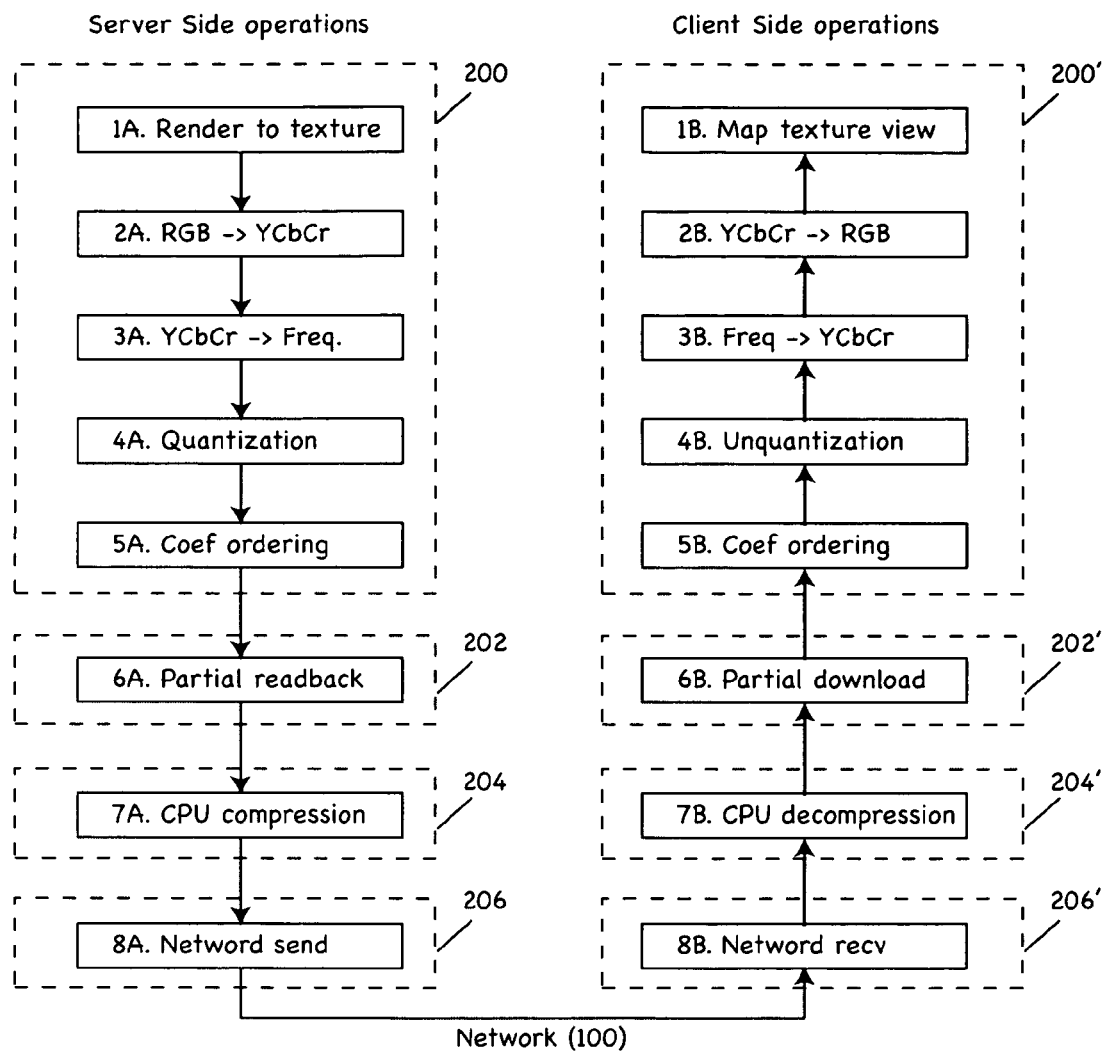
FIG. 2 is a flow diagram depicting image compression and decompression operations utilized in the system of FIG. 1.

FIG. 2 depicts methods for remote visualization, including methods for image compression and decompression according to the invention. Those methods are described below as executed on the system of FIG. 1, though, it will be appreciated that they may be carried out in other digital data processing environments, as well.

By way of overview, and as noted above, illustrated server digital data processor 10 compresses images for transmission to digital data processor 50. These may be images acquired from drive(s) or store(s) 36, image acquisition device(s) 38, or otherwise; transformations of such images; synthetically generated images; or otherwise. Client digital data processor 50 decompresses images received from digital data processor 10 for further processing and/or display.

Use of the GPUs by digital data processors 10 and 50 to execute these methods and, particularly, to execute compression/decompression has several advantages in terms of memory access bandwidth and computation performance. With respect to compression performed by server 10, these include, by way of non-limiting example:
reducing the size of data to download from GPU 14 to CPU 12,
increasing the compression ratio quality, and
decreasing compression power needed by the CPU 12, while still keeping a high compression ratio.

Parallel benefits are attained by client 12 with respect to decompression of images received from server 10.

In the illustrated embodiment, operations 1A-8A executed on the server side, i.e., on digital data processor 10, are executed under a global process wherein the CPU, GPU, GPU<->CPU and Network tasks (so demarcated by regions 200, 202, 204 and 206, respectively, of FIG. 2) are done in different threads. This is likewise true of the client side operations 1B-8B (as so indicated in the drawing by corresponding regions 200', 202', 204' and 206') on digital data processor 50. Other embodiments may execute such operations in a single thread on each of the server and client sides, in multiple processes or otherwise. Moreover, it will be appreciated that in other embodiments other operations may be executed on the server 10 and client 50 for the foregoing purposes, instead or in addition to the operations depicted in FIG. 2 and discussed below.

Server-Side Operations—Compression

Step 1A: Catch Rendering Output
Input: 3D Scene
Engine: OpenGL or DirectX . . . any other 3D engine
Output: RGB 2D Texture containing the projected image
Bypass direct rendering to video memory to render to a texture attached to frame buffer, which will be available for next transformation pass.

In this step, the GPU 14 makes the image available for rapid processing via the texture buffer 32. To this end, the GPU renders the 3D image (or "scene") to 2D texture buffer 32, rather than to video memory (or frame buffer) 20. The scene, which may be in the form of a scene graph or other data structure, can represent (i) an image acquired from drive(s) or store(s) 36, image acquisition device(s) 38, or otherwise, (ii) a transformation of such an image, (iii) a synthetically generated image, or (iv) otherwise. Prior to execution of step 1A, the scene may be stored in memory associated with or accessible by GPU 14 (e.g., such as buffers 28 and/or frame buffer 20) and, indeed, may represent an image currently being processed (e.g., transformed, analyzed, etc.) on server 10 and, more specifically, on GPU 14.

Rendering is effected with a 3D graphics engine of the type conventionally known in the art that executes on the GPU 14. Examples of such engines include OpenGL and DirectX, though other graphics engines known in the art may be used instead or in addition. Output of the rendered 3D scene to the 2D texture buffer 32 is accomplished utilizing instructions provided by the graphics engine or otherwise.

Step 2A: Color Space Transformation (RGB to YCbCr)
Input: RGB 2D Texture containing the projected image
Engine: GPU shader with simple matrix transformation
Output: YCbCr 2D Texture containing the projected 3D scene image.

The YCbCr color space conversion allows greater compression for the same image quality (or greater image quality for the same compression).

In this step, the GPU 15 converts the 3D image in the texture buffer 32 following Step 1A from the red-green-blue (RGB) color space into the YCbCr color space, thereby, making it readily amenable to compression. In the illustrated embodiment, the conversion is effected by texture shader 30 (or another shader of GPU 14) utilizing a conventional methodology for RGB-to-YCbCr conversion. In the illustrated embodiment, the shader 30 stores results of the conversion to texture buffer 32 or another buffer on GPU 14.

Step 3A: Color to Frequencies Transformation

Input: YCbCr 2D Texture containing the projected 3D scene image.

Engine1: GPU shader implementing DCT on lines (or "rows") of block;

Engine2: GPU shader implementing DCT on columns of block;

Output: Texture containing block of DCT coefficients of the source image.

Two passes of 1D Discrete Cosine Transform (DCT) are applied to the texture, one on lines the second on columns. The DCT is applied on sub-blocks of the Input on each component (or "channel") in parallel using intrinsic vector computing capabilities of the GPU.

In this step, the GPU 14 converts sub-blocks of the image generated in Step 2A from YCbCr color space to frequency space. In the illustrated embodiment, this is effected by texture shader 30 (or another shader of GPU 14). As noted, the shader 30 applies two passes of one-dimensional (1D) Discrete Cosine Transform (DCT) to the YCbCr values output by Step 2A and stored in texture buffer 32, the first pass on lines and the second on columns. As also noted, the DCT is applied on sub-blocks of each channel (i.e., the Y channel, the Cb channel and the Cr channel) of the input in parallel using, as noted, intrinsic vector computing capabilities of the GPU. The shader 30 stores the result, an array of DCT coefficients for each channel of values of each sub-block, to texture buffer 32 or another buffer on GPU 14.

Figure 3:
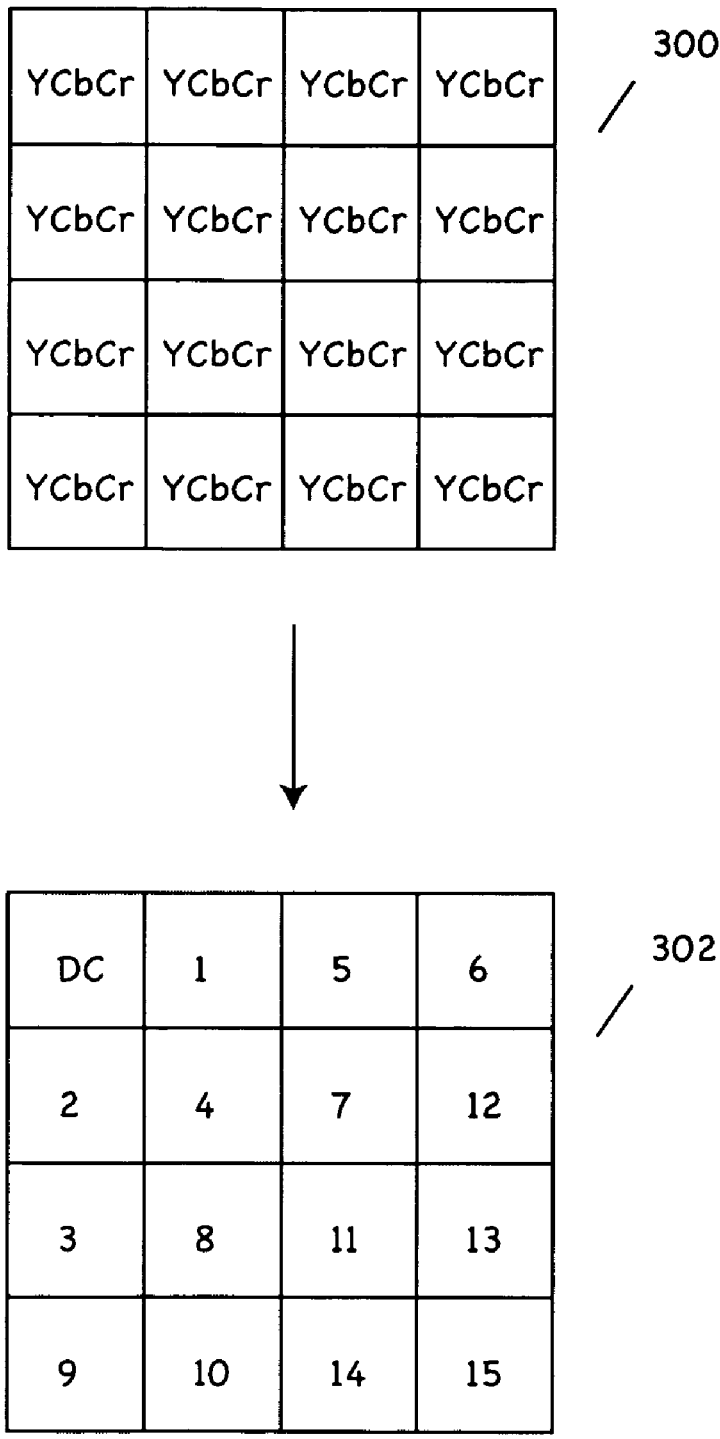
FIG. 3 depicts transformation of an exemplary sub-block of color intensity voxels to direct cosine transform coefficients in a system according to the invention.

Transformation of an exemplary 4×4 sub-block 300 of YCbCr values to an array 302 of DCT coefficients is illustrated in FIG. 3. Referring to array 302, it will be appreciated that the designation "DC" refers to the zero-order coefficient, the designation "1" refers to the first-order coefficient, the designation "2" refers to the second-order coefficient, and so forth up through the designation "15" which refers to the fifteenth-order coefficient. Although the illustration shows transformation of sixteen values (per channel) in sub-block 300 to sixteen coefficients (per channel) in array 302—thus, insuring that the frequency representation of the image will occupy the same space as the color representation—in other embodiments, the number of coefficients may not match the number of intensity values in the sub-block.

Step 4A: Quantization (Optional)

Input: Filtered texture

Engine: GPU shader: quantization matrix multiplication for each pixel.

Output: Quantized filtered texture

Quantization results in a first level of quality loss targeted. It reduces the amount of information in the high frequency components as the human eye is not good at distinguishing the exact strength of a high frequency brightness variation.

In this step, the GPU 14 quantizes the coefficients stored in texture buffer 32 following Step 3A, reducing them from their native size of 16- or 32-bits per coefficient (depending on the native floating-point processing capacity of the GPU) to 8-bits per coefficient. In the illustrated embodiment, this is effected by texture shader 30 (or another shader of GPU 14), which applies quantization matrix multiplication of the type known in the art. Other embodiments may employ other quantization techniques instead or in addition. The shader 30 stores the resulting quantized coefficients to texture buffer 32 or another buffer on GPU 14.

Step 5A: Coefficient Ordering

Input: Filtered texture

Engine: GPU shader doing DCT coefficients ordering

Output: Ordered and filtered texture

CPU 12 memory organization is linear, whereas GPU 14 memory organization is two-dimensional (2D), which means that, by way of non-limiting example, an 8×8 image with 4×4 sub-blocks of the type shown in FIG. 4A in GPU memory would be represented in the manner shown in FIG. 4B if directly download (or "readback") to the CPU. For illustrative purposes, the coefficients of the four respective 4×4 sub-blocks that make up the 8×8 image of FIG. 4A are denoted with subscripts 'a', 'b', 'c', and 'd', respectively.

Once in this format on a CPU, a good compression algorithm would be forced to reorganize data to find dictionary patterns inside this image. Such operations are costly on a CPU because of the pseudo-random data pattern and the limited memory bandwidth available on the CPU.

Instead of directly downloading to the CPU, the illustrated embodiment uses the GPU 14 high memory bandwidth capabilities to sort not only sub-block coefficient but all DCT coefficients of the image in a way that it will be linearly ordered for the CPU memory. This is effected by the texture shader 30 (or another shader of GPU 14), which reorders the coefficient arrays generated in Step 4A in the manner shown in FIG. 4C. As above, the subscripts 'a', 'b', 'c', and 'd' are used to denote coefficients from the respective blocks (of FIG. 4A).

Particularly, as evident in FIG. 4C, the shader orders the coefficients to get first, zero-order (DC) coefficients, then low frequencies coefficients and then high frequencies coefficients. More particularly, the shader 30 reorders the coefficients generated in Step 5A (or Step 4A, in the event Step 5A is not utilized) to place all DC coefficients for the image (or a portion thereof) first, followed by all first-order coefficients, followed by all second-order coefficients, and so forth, through all highest-order coefficients. Put another way, the shader 30 reorders the coefficients of the frequency-based representation of the image so that, rather than coefficients for like sub-blocks being stored together (as in FIG. 4A), coefficients of like order are stored together. The shader 30 stores the resulting reordered quantized coefficients to texture buffer 32 or another buffer on GPU 14.

Of course, it will be appreciated that, although FIGS. 4A and 4C depict an 8×8 image comprised of 4×4 sub-blocks, in a preferred embodiment, images of still larger size are supported and are partitioned into sub-blocks of 8×8.

It will be further appreciated that, FIGS. 4A and 4C, and the discussion above, focus on only the coefficients for a single channel of the image (e.g., coefficients generated from the Y channel), in practice, the shader 30 performs this Step 5A separately (but, preferably, in parallel) on coefficients of all three channels of the image (e.g., coefficients generated from each of the Y, Cb and Cr channels).

Step 6A: Readback Compression

Step 6A: Readbook Compression

Input1: ordered and filtered texture

Input2: D % (percent of lines to download)

Engine: GPU readback.

Output: CPU memory buffer D % smaller than original image.

This compression step is done at no cost as it consists in downloading from the GPU to the CPU only a specified portion of the reordered filtered image generated in Step 5A. All coefficients that are not readback are considered as zero (and are referred to occasionally hereinafter as "dropped"). As coefficients are ordered by importance from the human eye point of view, increasing the percentage of coefficients downloaded will increase precision/quality in a pseudo-linear way (in the frequency domain).

Higher compression ratio is achieved by downloading only lines of DC coefficients.

4×4 block:ratio max=16

8×8 block:ratio max=64

In this step, the GPU 14 downloads a portion of the reordered coefficients generated in Step 5A to the CPU 12. This is effected using the GPU 14 readback operation, with the texture buffer 32 as the source and specified memory locations of the RAM 16 (or other memory associated with the CPU 12) as the destination. Although all coefficients in each channel may be downloaded, the illustrated embodiment permits programmatic specification of a lesser portion of each channel—here, specified as a percentage of lines (or rows), though in other embodiments specified otherwise. The readback transfer (i.e., download) proceeds from "DC" or zero-order coefficients, to first-order coefficients, to second-order coefficients, and so-forth, in accord with the ordering effected in Step 5A. Hence, where a percentage is specified, it results in transfer of the most significant (lower-order) coefficients from each of the channels and dropping of the least significant (higher-order) coefficients.

Step 7A: CPU Compression (Optional but Recommended)

Input: CPU memory buffer D % smaller than original image.

Engine: Standard CPU compression algorithm

Output: Compressed image texture.

As most of the work to reorder data in a way where patterns are more easily found, the CPU compression algorithm can use a smaller buffer for pattern matching and using simple RLE or ZLib compression library gives very good results at very low CPU cost.

In this step, the CPU 12 is used to provide further compression of the image data downloaded from the GPU in Step 6A (and stored in RAM 16 or otherwise). To that end, the CPU 12 performs conventional data compression on the downloaded coefficients, preferably, using a lossless compression technique (such as RLE or ZLib), which allows for the image texture to be perfectly represented upon decompression in step 7B. However, in other embodiments, a lossy compression technique may be used, which will result in less perfect representation of the image texture upon decompression. Regardless, such compression is performed on the coefficients for each channel of the image.

Step 8A: Network Send

Following compression of the image in Steps 1A-7A, the compressed image values can be sent through the network 100 to one or more remote clients 50. This step is effected in the conventional manner by the I/O subsystem 18, operating in connection with CPU 12.

Parallelism

Compression techniques as described above can be employed in different parallelization schemes:

1) in embodiments in which the "server side" has only one GPU 14: frame pipeline GPU does filtering of a frame when CPU 12 does the compression of the previous frame.

2) in embodiments in which the "server side" has multiple GPUs (SMP or distributed), each GPU works on a portion of frame and for each GPU a CPU process does the CPU part in parallel. In this case frame pipeline parallelism is used too.

Client-Side Operations—Decompression

As further illustrated on the "client side" of FIG. 1, image decompression is effected by reversing the steps described above to get back the original texture image that it will map to a quad defining its complete viewport, as described further below. Notwithstanding that the steps performed by the client side are labelled "1B" through "8B," in the illustrated embodiment and the discussion that follows processing proceeds from "8B" to "1B".

Step 8B: Network receive

Thus, Step 8B reverses the operation of Step 8A. More specifically, the remote digital data processor 50 receives the compressed image data transmitted for all channels of the image in Step 8A at I/O subsystem 58, and stores it in RAM 56. In other embodiments, the compressed texture may be received and/or stored by other components of the digital data processor 50, e.g., under control of CPU 52.

Step 7B: CPU Decompression

Input: Compressed image texture.

Engine: Standard CPU decompression algorithm

Output: CPU memory buffer D % smaller than original image.

Similarly, Step 7B reverses the operations of Step 7A. More particularly, the CPU 52 decompresses the image data stored to RAM 56 in Step 8B. To this end, the CPU utilizes a decompression algorithm corresponding to the compression mechanism used in Step 7A (e.g., RLE, Zlib, etc.). The result is an array of coefficients of the frequency-based representation of the image arranged so that coefficients of like order are stored together (e.g., in the manner of FIG. 4C, albeit without the coefficients dropped in Step 6A). The CPU stores that result back to RAM 56. In the illustrated embodiment, the operations of this Step 7B are performed on all channels of the received data.

Input: CPU memory buffer D % smaller than original image.

Engine: GPU partial download

Output: Ordered and filtered texture

In this step, the CPU 52 downloads to GPU 54 and, particularly, to texture buffer 72, the coefficients generated in Step 7B. Missing coefficients—namely, those dropped during the readback operation in Step 6A and, accordingly, not transmitted by the server (in Step 8A) nor received by the client (in Step 8B)—are assumed to be zero. The CPU 52 pads the downloaded coefficients accordingly. The operations of this Step 6B are performed on the coefficients of all of the channels.

Step 5B: Coefficient Ordering

Input: Ordered and filtered texture

Engine: GPU shader doing DCT coefficients ordering

Output: Filtered texture

In this step, the GPU 54 and, particularly, the texture shader 70 reorders the coefficients downloaded to buffer 72 in Step 6B so as to place coefficients for like sub-blocks back into those sub-blocks (e.g., in the manner of FIG. 4A)—in essence, reversing the ordering that was effected in Step 5A. The shader 70 stores the results of that operation in texture buffer 72 or another buffer associated with GPU 54. As above, the operations of this Step 5B are performed on the coefficients of each channel.

Step 4B: Unquantization

Input: filtered texture

Engine: GPU shader: quantization matrix multiplication for each pixel.

Output: unquantized filtered texture

In this step, GPU 54 and, particularly, the texture shader 70, unquantizes the coefficients stored to texture buffer 72 following Step 5B. This can be effected by converting the coefficients from 8-bit values to 16- or 32-bit values (depending on the native floating-point processing capacity of GPU 54) or otherwise using unquantization techniques known in the art. Results of the operation are stored to texture buffer 72 or another buffer associated with GPU 54. As above, the operations of this Step 4B are performed on the coefficients of each channel.

Step 3B: Frequency to Color Transformation

Input: Texture containing block of DCT coefficients of the source image.

Engine1: GPU shader implementing an inverse DCT on columns of block

Engine2: GPU shader implementing an inverse DCT on lines of block;

Output: YCbCr 2D Texture containing the projected 3D scene image.

In this step, GPU 54 reverses Step 3A, transforming the coefficients stored to buffer 72 following step 4B from frequency space to each of the respective channels of YCbCr color space and, thereby, filling lines and columns of the sub-blocks of each of the channels with respective YCbCr intensity values. To effect this, the shader 70 applies a conventional inverse DCT operation of the type known in the art, storing the result to texture buffer 72 or another buffer associated with GPU 54.

Step 2B Color Space Transformation (YCbCr to RGB):

Input: YCbCr 2D Texture containing the projected 3D scene image.

Engine: GPU shader with simple matrix transformation

Output: RGB 2D Texture containing the projected image

In this step, the GPU shader 70 transforms the color values generated in Step 3B from YCbCr space to RGB color space. This is effected by texture shader 70 utilizing a conventional methodology for YCbCr-to-RGB conversion. In the illustrated embodiment, the shader 70 stores results of the conversion to texture buffer 72 or another buffer associated with GPU 54.

Step 1B: Map Texture View

Input: RGB 2D Texture containing the projected image

Engine: OpenGL or DirectX . . . any other 3D engine

Output: 3D Scene

In this step, the GPU 54 generates a 3D image from the RGB values generated in step 2B. To this end, the GPU uses a 3D graphics engine of the type described above to generate a 3D image in the video memory (or frame buffer) 60 of the client digital data processor for display on monitor 74.

Described above are methods and apparatus meeting the aforementioned objects. Those skilled in the art will appreciate that the embodiments illustrated and discussed herein are merely examples of the invention and that other embodiments, employing changes therein, fall within the scope of the invention. Thus, by way of example it will be appreciated that operations attributable to texture shaders in the discussion above may be accomplished by other functionality operating within the GPUs. In view thereof, what I claim is:

In view of the foregoing, what I claim is:

1. A method of image compression in a digital data processor having a CPU that is coupled to an associated GPU comprising the steps of:
   A. transforming, with the GPU, image values from a color representation to a frequency-based representation,
   B. with the GPU, re-ordering coefficients comprising the frequency-based representation such that coefficients of like order from multiple sub-blocks of the frequency-based representation of the image are ordered together,
   C. transferring the re-ordered coefficients to the CPU, the CPU at least one of storing and transmitting said coefficients.

2. The method of claim 1, comprising using the CPU to compress the re-ordered coefficients.

3. The method of claim 1, comprising using the CPU to transmit the compressed coefficients to a further digital data processor in communications coupling with the CPU.

4. The method of claim 3, wherein the GPU and the CPU are co-housed, and the further digital data processor is remote from said GPU and CPU.

5. The method of claim 1, further comprising
   D. with the CPU, compressing the coefficients via a run length encoding-based compression technique.

6. The method of claim 1, wherein step (A) further comprises transforming, with the GPU, the image values from an RGB color space to a YCbCr color space before transforming said image values to the frequency-based representation.

7. The method of claim 1, wherein step (A) further comprises transforming, with the GPU, the image values from the color representation to the frequency-based representation via a Fourier-related transform.

8. The method of claim 1, wherein step (A) further comprises transforming, with the GPU, the image values from the color representation to the frequency-based representation via a discrete cosine transform (DCT).

9. The method of claim 8, wherein step (A) further comprises transforming, with the GPU, the image values from a color representation into a frequency-based representation via a first pass of the DCT transform and a second pass of the DCT transform, wherein the first pass is performed on lines of the image values, and the second pass is performed on columns of the image values.

10. The method of claim 9, wherein step (A) further comprises quantizing the coefficients with the GPU.

11. The method of claim 1, wherein step (B) further comprises re-ordering the coefficients so that coefficients of a first order are followed by coefficients of a second order, which are followed by coefficients of a third order, and so forth.

12. A method of image decompression in a digital data processor having a CPU that is coupled to an associated GPU comprising the steps of:
    A. receiving compressed image values in memory associated with the CPU,
    B. transferring the compressed image values to the GPU, the compressed image values comprising coefficients of like order from multiple sub-blocks of a frequency-based representation of an image that are ordered together,
    C. with the GPU, re-ordering the compressed image values such that coefficients of like sub-blocks of the frequency-based representation of the image are stored together.

13. The method of claim 12, wherein step (B) further includes decompressing, with the CPU, the compressed image values before transferring the image values to the GPU.

14. The method of claim 12, wherein the step (A) comprises receiving compressed quantized image values in a memory associated with the CPU, wherein the quantized image values comprise coefficients having a data size reduced from a first size to a second size.

15. The method of claim 14, further comprising
    D. with the GPU, unquantizing the compressed quantized image values such that the data size of the coefficients are expanded from the second size to the first size.

16. The method of claim 12, further comprising
    D. with the GPU, transforming the image values from a frequency-based representation to a color space representation.

17. The method of claim 16, wherein step (D) transforms the image values from a frequency-based representation to a YCbCr color space via an inverse Discrete Cosine Transform (DCT).

18. The method of claim 17, wherein step (D) further comprises transforming, with the GPU, the image values from the YCbCr color space to an RGB color space.

19. The method of claim 17 further comprising
E. with the GPU, generating a three-dimensional image (14D) from the RGB color space image values, and storing that image in a memory.

20. In a digital data processing system, the improvement for image compression comprising:
A. a graphics processing unit (GPU) coupled to a central processing unit (CPU),
B. the GPU transforming image values from a color representation to a frequency-based representation and re-ordering coefficients comprising that frequency-based representation such that coefficients of like order from multiple sub-blocks of the frequency-based representation are ordered together,
C. the CPU receiving the re-ordered coefficients from the GPU and at least any of storing and transmitting the re-ordered coefficients.

21. The digital data processing system of claim 20, wherein the CPU compresses the re-ordered coefficients prior to storing and/or transmitting said coefficients.

22. The digital data processing system of claim 21, wherein the GPU compresses the re-ordered coefficients via any of a run length encoding-based compression technique and Zlib algorithm.

23. The digital data processing system of claim 20, wherein the GPU transforms the image values from an RGB color space to a YCbCr color space before said GPU transforms the image values to the frequency-based representation.

24. The digital data processing system of claim 23, wherein the GPU transforms the image values from the YCbCr color space to the frequency-based representation via a Fourier-related transform.

25. The digital data processing system of claim 23, wherein the GPU transforms the image values from the YCbCr color space to the frequency-based representation via a discrete cosine transform (DCT).

26. The digital data processing system of claim 25, wherein the GPU applies a quantization factor to said coefficients.

27. The digital data processing system of claim 20, wherein the GPU renders the image values to a texture stored in a buffer associated with the GPU.

28. In a digital data processing system, the improvement for image decompression comprising:
A. a graphics processing unit (GPU) coupled to a central processing unit (CPU),
B. the CPU receiving compressed image values in a memory associated with the CPU,
C. the CPU transferring the compressed image values to the GPU, the compressed image values comprising coefficients of like order from multiple sub-blocks of a frequency-based representation of an image that are ordered together,
D. the GPU re-ordering the compressed image values such that coefficients of like sub-blocks of the frequency-based representation of the image are stored together.

29. The digital data processing system of claim 28, wherein the CPU decompresses the compressed image values before transferring the image values to the GPU.

30. The digital data processing system of claim 28, wherein the CPU receives compressed quantized image values in a memory associated with the CPU, wherein the quantized image values comprise coefficients having a data size reduced from a first size to a second size.

31. The digital data processing system of claim 30, further comprising the GPU unquantizing the compressed quantized image values such that the data size of the coefficients are expanded from the second size to the first size.

32. The digital data processing system of claim 28, further comprising the GPU transforming the image values from a frequency-based representation to a color space representation.

33. The digital data processing system of claim 32, wherein the GPU transforms the image values from a frequency-based representation to a YCbCr color space via an inverse Discrete Cosine Transform (DCT).

34. The digital data processing system of claim 33, wherein the GPU transforms the image values from the YCbCr color space to an RGB color space.

35. The digital data processing system of claim 33, wherein the GPU generates a three-dimensional image (4D) from the RGB color space image values and stores that generated image in a memory.

36. A digital data processing system for remote visualization comprising:
A. a digital data processor having a graphics processing unit (GPU) associated with a central processing unit (CPU)
B. the GPU transforming image values from a color representation to a frequency-based representation and ordering coefficients comprising that frequency-based representation such that coefficients of like order from multiple sub-blocks of the frequency-based representation are ordered together,
C. the CPU receiving the ordered coefficients from the GPU and transmitting image values values comprising said coefficients to a remote digital data processor.

37. The digital data processing system of claim 36, wherein the remote digital data processor comprises a remote GPU associated with a remote CPU that receives the transmitted image values.

38. The digital data processing system of claim 37, wherein the remote CPU transfers the image values to the remote GPU, the remote GPU re-ordering the image values such that coefficients of like sub-blocks of the frequency-based representation are stored together.

39. The digital data processing system of claim 38, wherein the remote GPU transforms the image values from a frequency-based representation to a color space representation.

40. The digital data processing system of claim 39, wherein the remote GPU transforms the image values from a frequency-based representation to a YCbCr color space via an inverse Discrete Cosine Transform (DCT).

41. The digital data processing system of claim 40, wherein the remote GPU transforms the image values from the YCbCr color space to an RGB color space.

42. The digital data processing system of claim 38, wherein the remote GPU renders an image from the color space image values and outputs that rendered image to a display coupled to the remote digital data processor.

* * * * *